United States Patent
Kuwata

(10) Patent No.: US 8,582,670 B2
(45) Date of Patent: Nov. 12, 2013

(54) RECEIVING APPARATUS, TRANSMITTING-RECEIVING APPARATUS, AND TRANSMISSION SYSTEM METHOD THEREFOR

(75) Inventor: Naoki Kuwata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 444 days.

(21) Appl. No.: 12/768,190

(22) Filed: Apr. 27, 2010

(65) Prior Publication Data

US 2010/0284486 A1    Nov. 11, 2010

(30) Foreign Application Priority Data

May 8, 2009    (JP) .................................. 2009-113200

(51) Int. Cl.
*H04L 27/00*    (2006.01)

(52) U.S. Cl.
USPC .......................................... 375/259; 375/219

(58) Field of Classification Search
USPC .................... 375/219–222, 257, 358
See application file for complete search history.

(56) References Cited

U.S. PATENT DOCUMENTS

| | | | | |
|---|---|---|---|---|
| 6,031,847 A | * | 2/2000 | Collins et al. ................. | 370/508 |
| 6,154,797 A | * | 11/2000 | Burns et al. ..................... | 710/52 |
| 6,167,077 A | * | 12/2000 | Ducaroir et al. ............... | 375/219 |
| 2002/0027693 A1 | * | 3/2002 | Watanabe ...................... | 359/173 |
| 2005/0129408 A1 | * | 6/2005 | Kim et al. ...................... | 398/140 |
| 2006/0279445 A1 | * | 12/2006 | Kinyua et al. ................. | 341/155 |
| 2007/0006053 A1 | * | 1/2007 | Otto et al. ..................... | 714/700 |
| 2007/0050658 A1 | * | 3/2007 | Kuwata ......................... | 713/503 |
| 2009/0080881 A1 | | 3/2009 | Yokohama | |
| 2009/0086870 A1 | * | 4/2009 | Mohiuddin ................... | 375/371 |

FOREIGN PATENT DOCUMENTS

| | | |
|---|---|---|
| JP | 57-017046 | 1/1982 |
| JP | 11-341102 | 12/1999 |
| JP | 2002-223208 | 8/2002 |
| JP | 2005-101857 | 4/2005 |
| WO | 2006/106973 A1 | 10/2006 |

OTHER PUBLICATIONS

Japanese Office Action mailed Mar. 5, 2013 for corresponding Japanese Application No. 2009-113200.

* cited by examiner

*Primary Examiner* — Emmanuel Bayard
(74) *Attorney, Agent, or Firm* — Staas & Halsey LLP

(57) ABSTRACT

A receiving apparatus receives parallel data signals including a plurality of channels from a transmitting apparatus. The receiving apparatus includes a receiver, a detector, and a switch. The receiver receives the parallel data signals. The detector detects a first skew between channels within the receiving apparatus, and a second skew between channels prior to reception by the receiver. The switch interchanges the plurality of channels of the parallel data signals so as to reduce a total skew as a sum of the first skew and the second skew.

14 Claims, 16 Drawing Sheets

FIG. 7

| ADDRESS | CONTENTS |
|---|---|
| 0 | INPUT PORT FOR OUTPUT TO OUT0 |
| 1 | INPUT PORT FOR OUTPUT TO OUT1 |
| 2 | INPUT PORT FOR OUTPUT TO OUT2 |
| 3 | INPUT PORT FOR OUTPUT TO OUT3 |
| 4 | INPUT PORT FOR OUTPUT TO OUT4 |
| 5 | INPUT PORT FOR OUTPUT TO OUT5 |
| 6 | INPUT PORT FOR OUTPUT TO OUT6 |
| 7 | INPUT PORT FOR OUTPUT TO OUT7 |

FIG. 12

(UNIT: ns)

| ch | $D_{T1n}$ | $D_{L12n}$ | $D_{R2n}$ | TOTAL |
|---|---|---|---|---|
| 3 | 0 | 0 | 0 | 0 |
| 2 | 5 | 10 | 5 | 20 |
| 1 | 10 | 20 | 10 | 40 |
| 0 | 25 | 35 | 15 | 75 |

FIG. 13

(UNIT:ns)

| SIGNAL | $D_{T1n}$ | $D_{L12n}$ | $D_{R2n}$ | TOTAL |
|---|---|---|---|---|
| VL3 | 0 | 0 | 0 | 35 |
| VL2 | 5 | 10 | 5 | 30 |
| VL1 | 10 | 20 | 10 | 35 |
| VL0 | 25 | 35 | 15 | 35 |

RECEIVING APPARATUS, TRANSMITTING-RECEIVING APPARATUS, AND TRANSMISSION SYSTEM METHOD THEREFOR

CROSS-REFERENCE TO RELATED APPLICATIONS

This application is based upon and claims the benefit of priority of the prior Japanese Patent Application No. 2009-113200, filed on May 8, 2009, the entire contents of which are incorporated herein by reference.

FIELD

Various embodiments described herein relate to a receiving apparatus which receives parallel data signals including a plurality of channels, a transmitting-receiving apparatus which transmits and receives the parallel data signals, a transmission system including a transmitting apparatus and a receiving apparatus, and method therefor.

BACKGROUND

In recent optical communications systems, the transmission capacity is increased by raising the bit rate. On the other hand, when transmitting signals between internal modules such as a transmitting apparatus and a receiving apparatus or between integrated circuits (ICs) in an optical communications system, low-speed transmission or signal processing is generally performed by using not high-speed serial signals but parallel signals obtained by converting serial signals into a parallel form.

In transmission of parallel signals, the transmission rate per channel decreases as the number of parallel signal transmissions increases. This eases the high-speed characteristics required of a device, and also facilitates phase matching between channels. On the other hand, an increase in the number of parallel signal transmissions gives rise to such problems as an increase in the number of pins on ICs or modules, the resulting increase in the size of a package or the like, and an increase in the mounting area of transmission lines.

Currently, as a scheme for parallel transmission of signals at a bit rate of 40 Gbit/s, standardization of a scheme which performs transmission using four channels with a bit rate of 10 Gbit/s is underway. Furthermore, a scheme for parallel transmission of signals at 100 Gbit/s has been also proposed. However, an attempt to perform phase matching between channels at various locations in a parallel transmission interface leads to an increase in the circuit scale or power consumption of individual circuits including an optical transmitting-receiving circuit.

Accordingly, in the Multi-Lane Distribution (MLD) scheme of 40 Gbit/s and 100 Gbit/s Ethernet (registered trademark), phase shifts between channels (lanes) during transmission are tolerated, and phases are matched at once in the circuit at the receiving side.

FIG. 1 illustrates an exemplary configuration of such a parallel transmission system. The parallel transmission system in FIG. 1 includes Physical Coding Sublayer/Multi-Lane Distribution (PCS/MLD) circuits 101, 104, and Physical Medium Attachment/Physical Medium Dependent (PMA/PMD) circuits 102, 103. Of these, the PCS/MLD circuit 101 and the PMA/PMD circuit 102 are circuits at the transmitting side, and the PMA/PMD circuit 103 and the PCS/MLD circuit 104 are circuits at the receiving side.

The PCS/MLD circuits 101, 104 are connected to a layer above the Media Access Interface (MAC) layer by 100G Medium Independent Interface/40G Medium Independent Interface (CGMII/XLGII). In addition, the PCS/MLD circuits 101, 104 and the PMA/PMD circuits 102, 103 are connected by 100G Attachment Unit Interface/40G Attachment Unit Interface (CAUI/XLAUI). Further, the PMA/PMD circuit 102 and the PMA/PMD circuit 103 are connected by a link (transmission path) of m channels.

The CGMII/XLGMII is a logical interface within a chip. The CAUI/XLAUI is an electrical interface between chips. If the number of channels between the PCS/MLD circuits and the PMA/PMD circuits is N, N=4 in the case of 40 Gbit/s, and N=10 in the case of 100 Gbit/s.

The number m of channels for parallel transmission between the PMA/PMD circuit 102 and the PMA/PMD circuit 103 is not necessarily fixed. The number m of channels for parallel transmission between the PMA/PMD circuit 102 and the PMA/PMD circuit 103 varies such that the number of channels may be 4 or 10 even in the case of 100 Gbit/s. The number m of channels for parallel transmission between the PMA/PMD circuit 102 and the PMA/PMD circuit 103 may be 1.

The PMA/PMD circuit 102 converts parallel signals of N channels outputted from the PCS/MLD circuit 101 into signals of m channels and outputs the signals to the transmission path. The PMA/PMD circuit 103 converts the signals of m channels received from the transmission path into parallel signals of N channels and outputs the parallel signals to the PCS/MLD circuit 104.

Skew as the difference in delay time between signals on individual channels can occur at the following locations in the parallel transmission system. (1) Within the PCS/MLD circuit 101: Transmitting-side PCS skew (2) Between the PCS/MLD circuit 101 and the PMA/PMD circuit 102: Transmitting-side electrical skew (3) Within the PMA/PMD circuit 102: Transmitting-side PMA/PMD skew (4) Between the PMA/PMD circuit 102 and the PMA/PMD circuit 103: Transmission skew (5) Within the PMA/PMD circuit 103: Receiving-side PMA/PMD skew (6) Between the PMA/PMD circuit 103 and the PCS/MLD circuit 104: Receiving-side electrical skew (7) Within the PCS/MLD circuit 104: Receiving-side PCS skew Since each of the skews (1) to (7) mentioned above is accumulated at the receiving side, it is desirable to correct the accumulated skew in the PCS/MLD circuit 104.

FIG. 2 illustrates a method of correcting skew accumulated in the case of N=m=4. The PCS/MLD circuit 101 at the transmitting side splits a bit string to be transmitted into blocks of predetermined size (1, 2, 3, 4, . . . ) and periodically divides the blocks among four channels for output as parallel signals. At this time, the PCS/MLD circuit 101 inserts an alignment block A for skew measurement at the beginning of each channel. In the proposed scheme, the block size is 66 bits, of which 2 bits are used as a header.

The PCS/MLD circuit 104 at the receiving side detects the alignment blocks A of the four channels, and corrects skew by a deskew circuit (not shown) to align the blocks of the four channels. The detected alignment blocks A are deleted.

A typical skew compensation circuit is selects a delay time for skew compensation by switching outputs of a delay circuit by a switching circuit.

A typical skew compensation apparatus is detects an amount of skew in each channel at a timing determined on the basis of a frame signal generated for each channel, and compensates for the timing of parallel data for each channel.

Typical systems are discussed in Japanese Laid-open Patent Publication No. 57-017046 and Japanese Laid-open Patent Publication No. 11-341102.

The parallel transmission systems according to the related art described above have at least the following problems.

If each of the skews (1) to (7) mentioned above is accumulated, a very large skew can occur in the PCS/MLD circuit 104 at the receiving side. For example, when the maximum values of the transmitting-side PCS skew, transmission skew, and receiving-side PCS skew are estimated to be 25 ns, 35 ns, and 15 ns, respectively, a skew of up to about 80 ns occurs in total. This amount of skew is equivalent to 800 UI (800 bits) in terms of a bit rate of 10 Gbit/s.

To ensure phase matching between channels by correcting 800 bits of skew, it is necessary to provide a First-In First-Out (FIFO) circuit of 1000 bits or more per channel. Provision of a First-In First-Out (FIFO) circuit of 1000 bits or more leads to an increase in the circuit scale or power consumption of a deskew circuit.

The same problem occurs not only in the case of MLD scheme of 40 Gbit/s and 100 Gbit/s but also in cases when skew is accumulated in a parallel transmission system in which parallel data signals are transmitted. This problem does not depend upon whether the transmission path between the transmitting apparatus and the receiving apparatus is an optical transmission path or not.

An object of an embodiment of the present invention is to avoid an increase in a circuit scale of a deskew circuit including in a parallel transmission system which transmits parallel data signals including a plurality of channels.

SUMMARY

A receiving apparatus receives parallel data signals including a plurality of channels from a transmitting apparatus. The receiving apparatus includes a receiver, a detector, and a switch. The receiver receives the parallel data signals. The detector detects a first skew between channels within the receiving apparatus, and a second skew between channels prior to reception of the parallel data signals by the receiver. The switch interchanges the plurality of channels of the parallel data signals so as to reduce a total skew as a sum of the first skew and the second skew.

The object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 7 illustrates a storage area of a register in a switching circuit;

FIG. 12 illustrates detected amounts of skew;

FIG. 13 illustrates amount(s) of skew reduced by a switching control in which interchanging of channels is performed at both a transmitting side and a receiving side;

DETAILED DESCRIPTION

Figure 1:
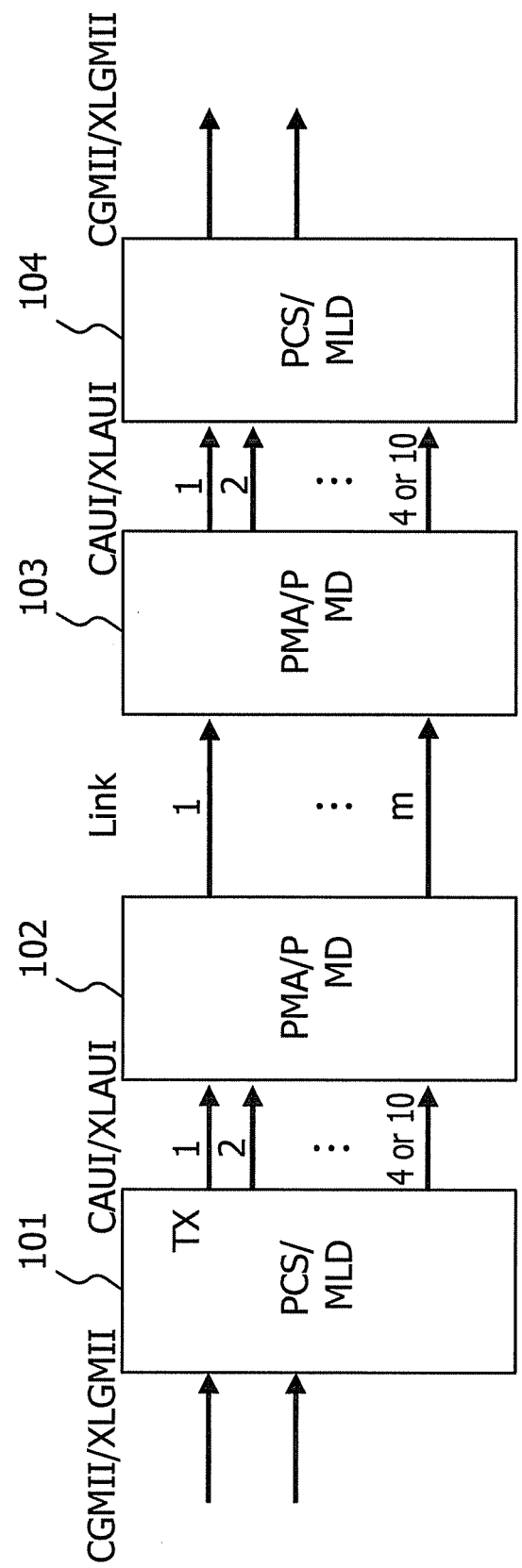
FIG. 1 illustrates a block diagram of a transmission system according to a related art.

Reference will now be made in detail to the embodiments, examples of which are illustrated in the accompanying drawings, wherein like reference numerals refer to the like elements throughout. The embodiments are described below to explain the present invention by referring to the figures. Hereinbelow, an embodiment will be described in detail with reference to the drawings.

As described above, generally, the main causes of skew in a transmission system which transmits parallel data signals can be roughly classified to inside of a transmitting apparatus, a transmission path, and inside of a receiving apparatus. For example, by detecting skew inside of a transmitting apparatus, a transmission path, and inside of a receiving apparatus at activation of the transmission system, skew occurring at each of the locations can be grasped. Then, channels are interchanged so that the overall skew of the transmission system is reduced. For example, the channel having the largest skew inside the transmitting apparatus is combined with the channel having the smallest skew in the transmission path. Thus, the FIFO circuit provided in the deskew circuit of the receiving apparatus can be reduced.

Figure 3:
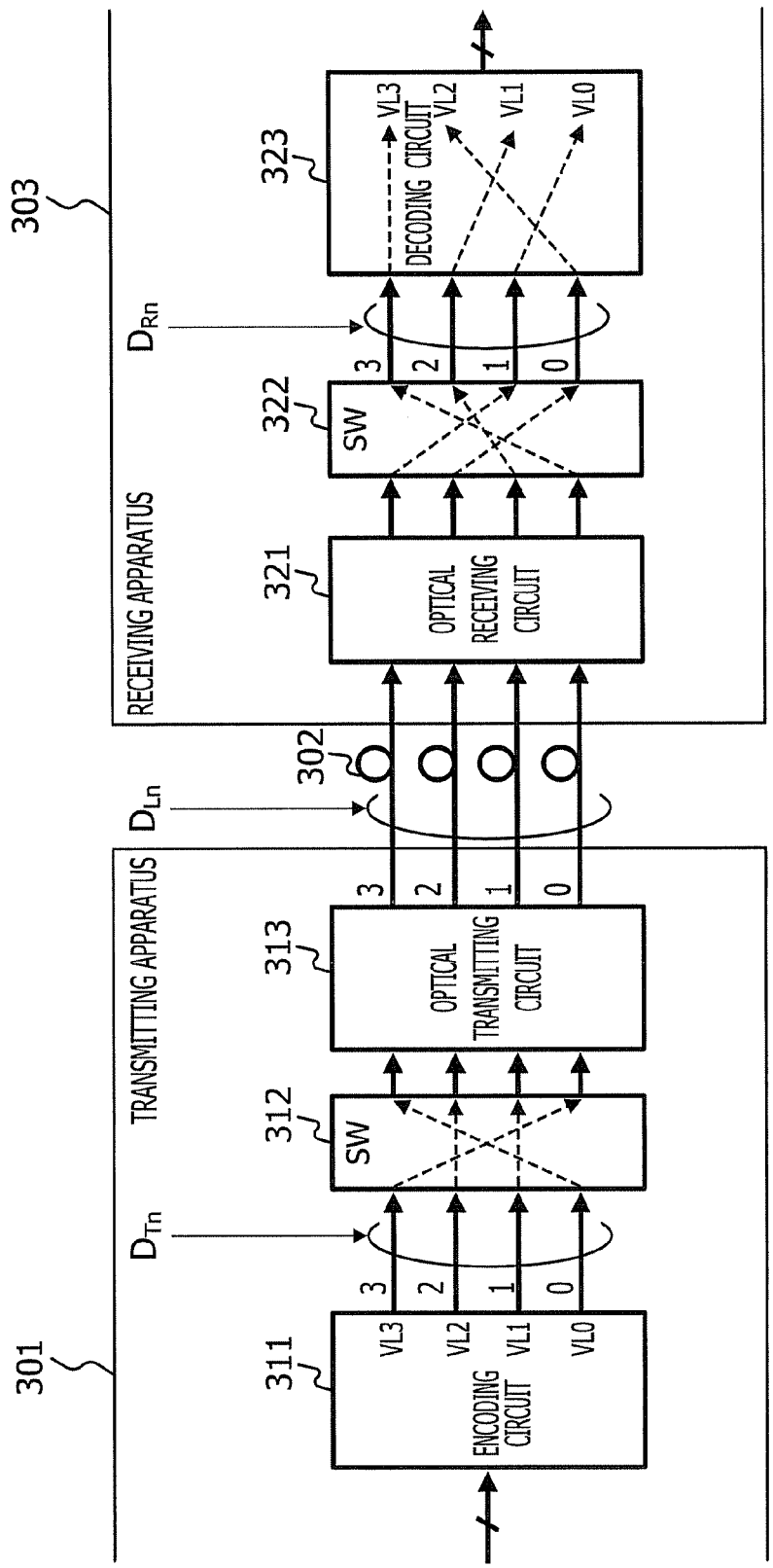
FIG. 3 illustrates a block diagram of a first transmission system.

FIG. 3 illustrates an exemplary configuration of a transmission system according to an embodiment. The transmission system in FIG. 3 includes a transmitting apparatus 301, a transmission path 302, and a receiving apparatus 303. Parallel data signals of four channels are transmitted from the transmitting apparatus 301 to the receiving apparatus 303 via the transmission path 302. While specific descriptions of operations and components are described in association with FIG. 3 such as channels, the present invention is not limited to any particular number of operations and components.

In this example, electrical signals are used for transmission inside the transmitting apparatus 301 and inside the receiving apparatus 303, and optical signals are used for transmission between the transmitting apparatus 301 and the receiving apparatus 303. It is also possible to use electrical signals, radio signals, or the like for transmissions between the transmitting apparatus 301 and the receiving apparatus 303.

The transmitting apparatus 301 includes an encoding circuit 311, a switching circuit (SW) 312, and an optical transmitting circuit 313. The receiving apparatus 303 includes an optical receiving circuit 321, a switching circuit 322, and a decoding circuit 323.

In the case of transmission systems in the MLD schemes of 40 Gbit/s and 100 Gbit/s, the encoding circuit 311 and the optical transmitting circuit 313 correspond to the PCS/MLD circuit 101 and the PMA/PMD circuit 102 shown in FIG. 1, respectively. In addition, the optical receiving circuit 321 and the decoding circuit 323 correspond to the PMA/PMD circuit 103 and the PCS/MLD circuit 104 shown in FIG. 1, respectively.

The encoding circuit 311 encodes a transmitting signal generated inside or outside the transmitting apparatus 301, generates parallel data signals VL0, VL1, VL2 and VL3 of four channels, and transfers the parallel data signals to the optical transmitting circuit 313. The optical transmitting circuit 313 converts the parallel data signals into optical signals of four channels and outputs the optical signals to the transmission path 302.

The optical receiving circuit 321 converts the optical signals inputted from the transmission path 302 into electrical signals, generates parallel data signals of four channels, and transfers the parallel data signals to the decoding circuit 323 via the switching circuit 322. The decoding circuit 323 includes a deskew circuit (not shown), and performs decoding and skew correction on the parallel data signals. Then, the decoding circuit 323 reconstructs the original transmitting signal and outputs the original transmitting signal to the inside or outside of the receiving apparatus 303.

At this time, the switching circuits 312 and 322 interchange the channels of parallel data signals so that a total skew accumulated on the transmission path from the encoding circuit 311 to the decoding circuit 323 becomes as small as possible.

In this regard, the amount of skew of channel n (n=0, 1, 2, 3) at each location in the transmission system is defined as follows.

DTn: Between the encoding circuit 311 and the switching circuit 312

DLn: The transmission path 302

DRn: Between the optical receiving circuit 321 and the decoding circuit 323

The switching circuits 312 and 322 interchange the channels of parallel data signals so that the total skew as the sum of DTn, DLn, and DRn becomes small. The decoding circuit 323 returns an order of channels interchanged by the switching circuit 322 to an order of the original signals VL0, VL1, VL2 and VL3. By performing interchanging of channels in this way, the FIFO circuit necessary for skew correction in the decoding circuit 323 can be reduced. The interchanging of channels may be performed by using only one of the switching circuit 312 and the switching circuit 322. The switching circuit to be used for the interchanging of the channels may be selectively selected.

Figure 4:
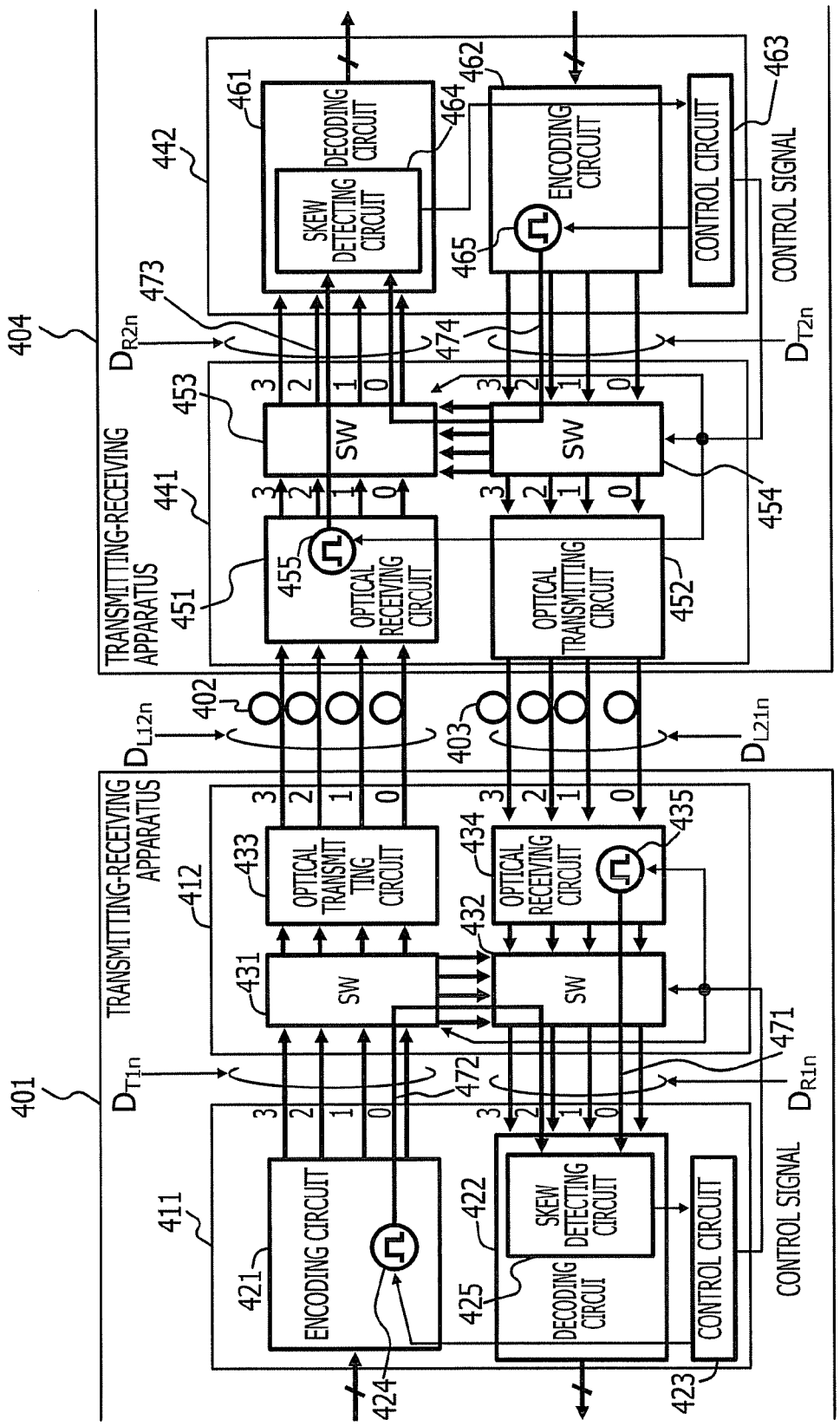
FIG. 4 illustrates a block diagram of a second transmission system.

FIG. 4 illustrates an exemplary configuration in which the transmission system shown in FIG. 3 is extended to two-way transmission. The transmission system shown in FIG. 4 includes a transmitting-receiving apparatus 401, transmission paths 402, 403, and a transmitting-receiving apparatus 404. Parallel data signals of four channels are transmitted between the transmitting-receiving apparatus 401 and the transmitting-receiving apparatus 404 via the transmission paths 402 and 403.

The transmitting-receiving apparatus 401 includes a code processing circuit 411 and an optical transmitting-receiving circuit 412. The code processing circuit 411 includes an encoding circuit 421, a decoding circuit 422, and a control circuit 423. The optical transmitting-receiving circuit 412 includes switching circuits 431, 432, and optical transmitting circuit 433 and an optical receiving circuit 434. The encoding circuit 421 includes a signal generating circuit 424. The decoding circuit 422 includes a skew detecting circuit 425 and a deskew circuit (not shown). The optical receiving circuit 434 includes a signal generating circuit 435.

The transmitting-receiving apparatus 404 includes an optical transmitting-receiving circuit 441 and a code processing circuit 442. The optical transmitting-receiving circuit 441 includes an optical receiving circuit 451, an optical transmitting circuit 452, and switching circuits 453, 454. The code processing circuit 442 includes a decoding circuit 461, an encoding circuit 462, and a control circuit 463. The optical receiving circuit 451 includes a signal generating circuit 455. The decoding circuit 461 includes a skew detecting circuit 464 and a deskew circuit (not shown). The encoding circuit 462 includes a signal generating circuit 465.

The circuit operation when transmitting parallel data signals from the transmitting-receiving apparatus 401 to the transmitting-receiving apparatus 404 is as follows. The encoding circuit 421 encodes a transmitting signal generated inside or outside the transmitting apparatus 401, generating parallel data signals of four channels, and transfers the parallel data signals to the optical transmitting circuit 433. The optical transmitting circuit 433 converts the parallel data signals into optical signals of four channels and outputs the optical signals to the transmission path 402.

The optical receiving circuit 451 converts the optical signals inputted from the transmission path 402 into electrical signals, generating parallel data signals of four channels, and transfers the parallel data signals to the decoding circuit 463 via the switching circuit 453. The decoding circuit 461 performs decoding and skew correction on the parallel data signals, and reconstructs the original transmitting signal and outputs the original transmitting signal to the inside or outside of the transmitting-receiving apparatus 404.

The circuit operation when transmitting parallel data signals from the transmitting-receiving apparatus 404 to the transmitting-receiving apparatus 401 is the same as the circuit operation described above. The amount of skew of channel n (n=0, 1, 2, 3) at each location in the transmission system is defined as follows.

DT1n: From the code processing circuit 411 to the optical transmitting-receiving circuit 412

DL12n: The transmission path 402

DR2n: From the optical transmitting-receiving circuit 441 to the code processing circuit 442

DT2n: From the code processing circuit 442 to the optical transmitting-receiving circuit 441

DL21n: The transmission path 403

DR1n: From the optical transmitting-receiving circuit 412 to the code processing circuit 411

The switching circuits 431 and 453 interchange the channels of parallel data signals so that the total skew as the sum of DT1n, DL12n, and DR2n becomes small. The decoding circuit 461 returns the order of channels interchanged by the switching circuit 463 to the original order.

On the other hand, the switching circuits 454 and 432 interchange the channels of parallel data signals so that the total skew as the sum of DT2$n$, DL21$n$, and DR1$n$ becomes small. The decoding circuit 422 returns the order of channels interchanged by the switching circuit 432 to the original order. By performing interchanging of channels in this way, the FIFO circuit necessary for skew correction in the decoding circuits 422 and 461 can be reduced.

Next, a method of detecting the amount of skew at each location will be described. The control circuit 423 of the transmitting-receiving apparatus 401 outputs control signals to control the operations of the signal generating circuits 424, 435 and the switching circuits 431, 432. The signal generating circuit 435 outputs parallel signals for skew measurement in accordance with the control signal, and the switching circuit 432 outputs the parallel signals to the decoding circuit 422 as they are. By using the parallel signals inputted to the decoding circuit 422, the skew detecting circuit 425 calculates the amount of skew DR1$n$ of each channel in a path 471 from the signal generating circuit 435 to the skew detecting circuit 425.

Next, the signal generating circuit 424 outputs parallel signals for skew measurement in accordance with the control signal, and the switching circuit 431 outputs the parallel signals to the switching circuit 432 as they are. The switching circuit 432 outputs the parallel signals to the decoding circuit 422 as they are. Thus, the parallel signals outputted from the optical transmitting-receiving circuit 411 are looped back by the optical transmitting-receiving circuit 412 and returned to the optical transmitting-receiving circuit 411.

By using the parallel signals inputted to the decoding circuit 422, the skew detecting circuit 425 calculates the amount of skew of each channel in a path 472 from the signal generating circuit 424 to the skew detecting circuit 425. The skew detecting circuit 425 subtracts the amount of skew DR1$n$ from the amount of skew in the path 472 to calculate the amount of skew DT1$n$.

In the transmitting-receiving apparatus 404, as in the transmitting-receiving apparatus 401, the control circuit 463 controls the operations of the signal generating circuits 455, 465 and the switching circuits 453, 454. Then, the skew detecting circuit 464 calculates the amount of skew DR2$n$ in a path 473 and the amount of skew in a path 474. The skew detecting circuit 464 subtracts the amount of skew DR2$n$ from the amount of skew in the path 474 to calculate the amount of skew DT2$n$.

According to this detection method, the transmitting-receiving apparatuses 401 and 404 can detect the amounts of skew DR1$n$, DT1$n$, DR2$n$, and DT2$n$ inside the apparatuses without requiring communication with the other apparatus.

Figure 5:
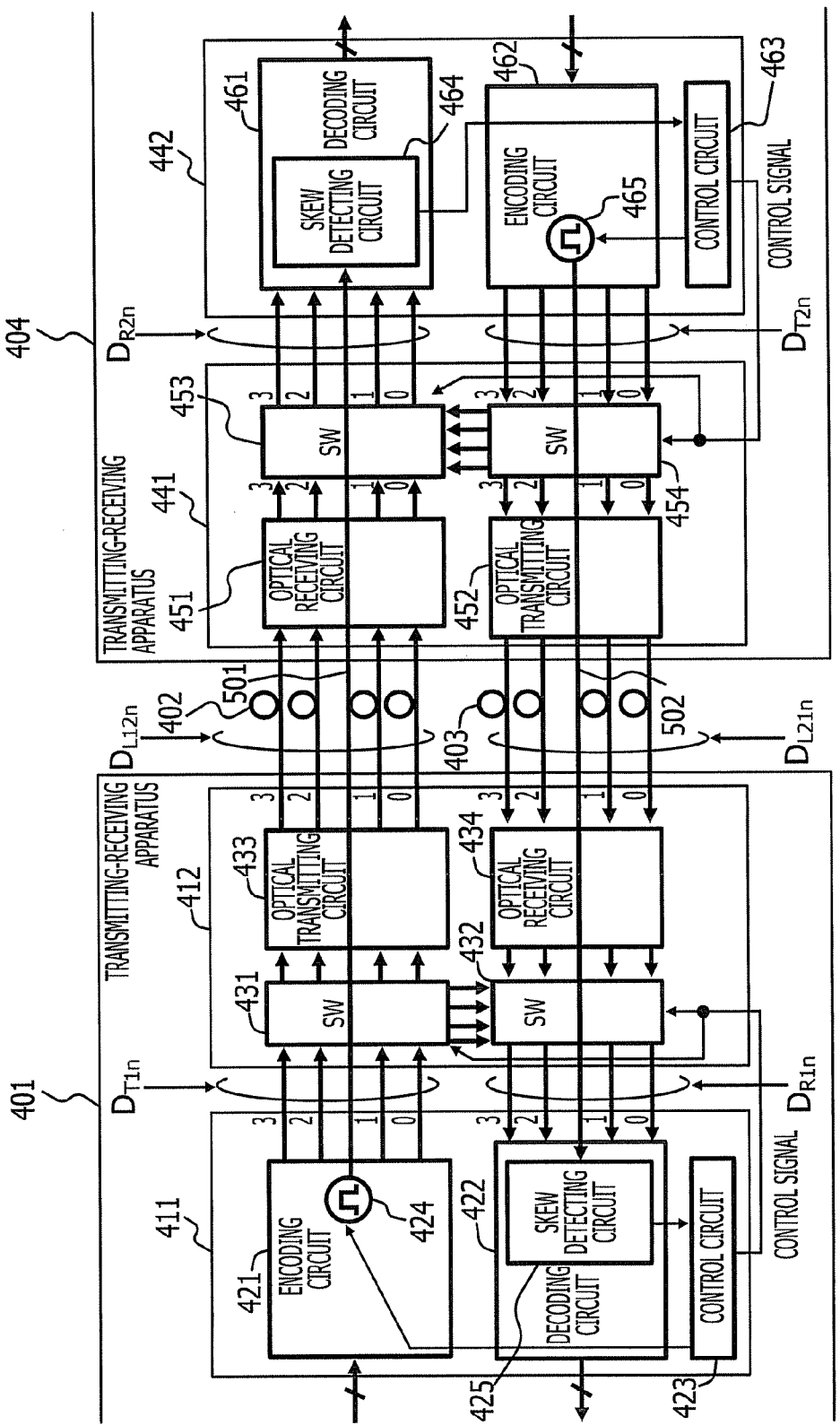
FIG. 5 illustrates a method of detecting amount(s) of skew in transmission path(s) in the second transmission system.

Upon detecting the amounts of skew inside the apparatuses, next, as shown in FIG. 5, the transmitting-receiving apparatus 401 and the transmitting-receiving apparatus 404 communicate with each other so that the amounts of skew DL12$n$ and DL21$n$ in the transmission paths are detected.

First, the signal generating circuit 465 outputs parallel signals for skew measurement in accordance with the control signal, and the switching circuit 454 outputs the parallel signals to the optical transmitting circuit 452 as they are. The optical transmitting circuit 452 converts the parallel signals into optical signals and outputs the optical signals to the transmission path 403.

The optical receiving circuit 434 converts the optical signals inputted from the transmission path 403 into electrical signals to generate parallel signals, and outputs the parallel signals to the switching circuit 432. The switching circuit 432 outputs the parallel signals to the decoding circuit 422 as they are. By using the parallel signals inputted to the decoding circuit 422, the skew detecting circuit 425 calculates the amount of skew of each channel in a path 502 from the signal generating circuit 465 to the skew detecting circuit 425.

Likewise, by using parallel signals outputted from the signal generating circuit 424, the skew detecting circuit 464 calculates the amount of skew of each channel in a path 501 from the signal generating circuit 424 to the skew detecting circuit 464.

The transmitting-receiving apparatus 401 notifies the transmitting-receiving apparatus 404 of DR1$n$, DT1$n$ detected by the skew detecting circuit 425, and the amount of skew in the path 502. On the other hand, the transmitting-receiving apparatus 404 notifies the transmitting-receiving apparatus 401 of DR2$n$, DT2$n$ detected by the skew detecting circuit 464, and the amount of skew in the path 501.

The control circuits 423 and 463 subtract DT1$n$ and DR2$n$ from the amount of skew in the path 501 to calculate the amount of skew DL12$n$ in the transmission path 402. In addition, the control circuits 423 and 463 subtract DT2$n$ and DR1$n$ from the amount of skew in the path 502 to calculate the amount of skew DL21$n$ in the transmission path 403. Then, the control circuits 423 and 463 switch the switching circuits 431 and 453 so that the total skew as the sum of DT1$n$, DL12$n$, and DR2$n$ becomes small, and switch the switching circuits 432 and 454 so that the total skew as the sum of DT2$n$, DL21$n$, and DR1$n$ becomes small.

Figure 6:
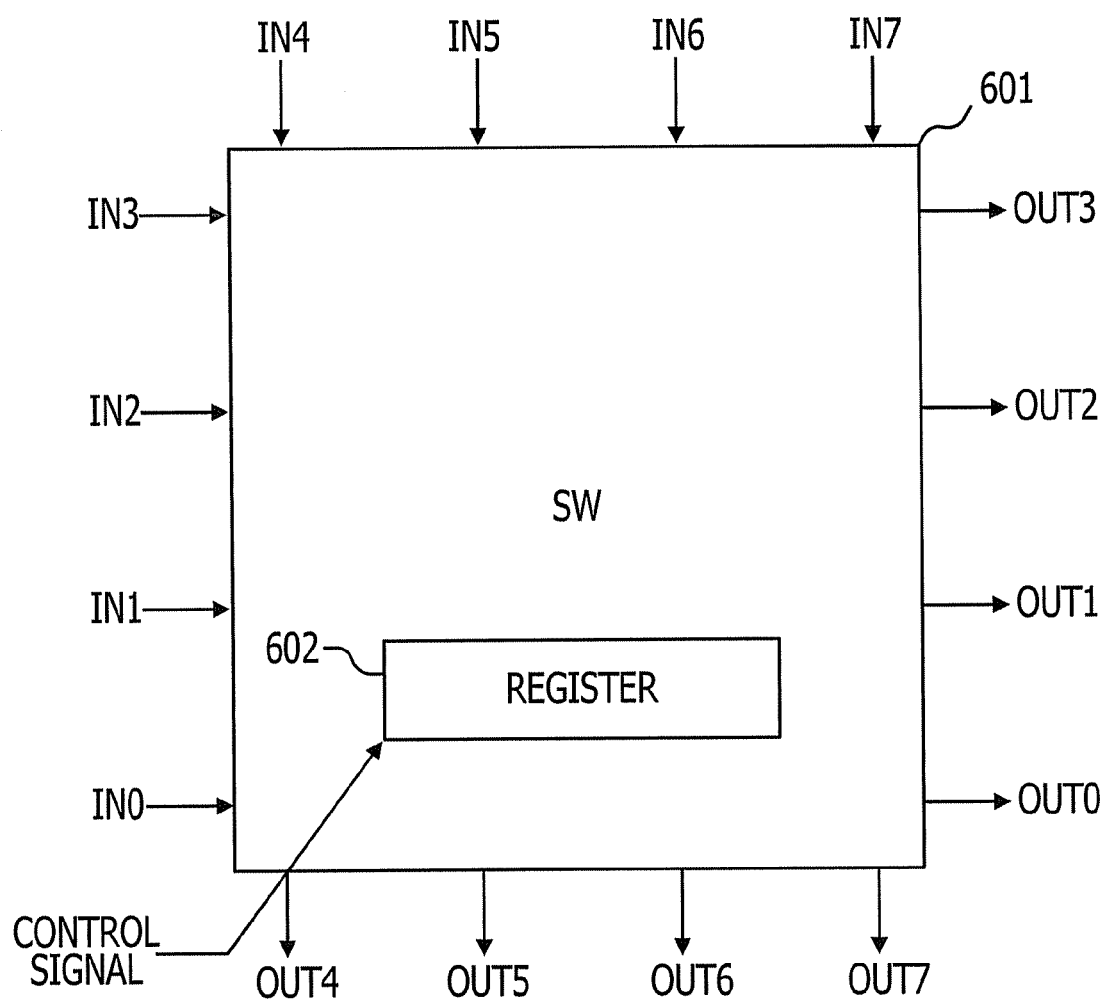
FIG. 6 illustrates a method of controlling a switching circuit.

FIG. 6 illustrates a method of controlling a switching circuit 601 corresponding to the switching circuits 431, 432, 453, and 454. Parallel data signals or parallel signals are inputted to input ports IN0, IN1, IN2 and IN3 from the encoding circuits 421, 462 or the optical receiving circuits 434, 451. Parallel signals are inputted to input ports IN4, IN5, IN6 and IN7 from the switching circuit 431 or 454. Parallel data signals or parallel signals are outputted from output ports OUT0, OUT1, OUT2 and OUT3 to the optical transmitting circuits 433, 452 or the decoding circuits 422, 461. Parallel signals are outputted from output ports OUT4, OUT5, OUT6 and OUT 7 to the switching circuit 432 or 453.

The correspondence between the input ports IN0, IN1, IN2, IN3, IN4, IN5, IN6 and IN7 and the output ports OUT0, OUT1, OUT2, OUT3, OUT4, OUT5, OUT6 and OUT7 is set in a register 602 of the switching circuit 601 by a control signal outputted from the control circuit 423 or 463.

FIG. 7 illustrates the storage area of the register 602. By a control signal, pieces of identification information of input ports to be connected to the output ports OUT0, OUT1, OUT2, OUT3, OUT4, OUT5, OUT6 and OUT7 are written to addresses 0, 1, 2, 3, 4, 5, 6 and 7 of the register 602, respectively. The switching circuit 601 performs switching of ports so that a signal inputted from each input port is outputted from the corresponding output port.

Figure 8:
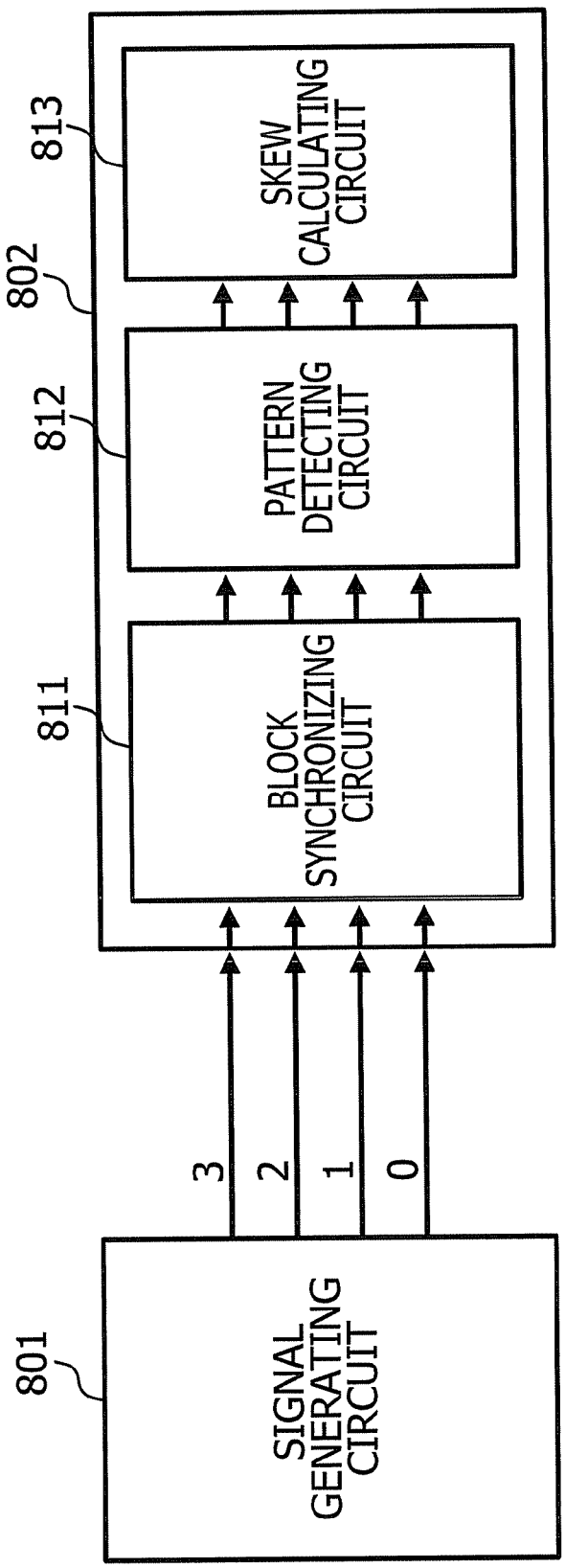
FIG. 8 illustrates a block diagram of a skew detecting circuit.

FIG. 8 illustrates an exemplary configuration of the skew detecting circuits 425 and 464. A skew detecting circuit 802 corresponds to the skew detecting circuit 425 or 464, and includes a block synchronizing circuit 811, a pattern detecting circuit 812, and a skew calculating circuit 813. The signal generating circuit 801 corresponds to the signal generating circuit 424, 435, 455, or 465, and outputs parallel signals of four channels to the skew detecting circuit 802.

Figure 9:
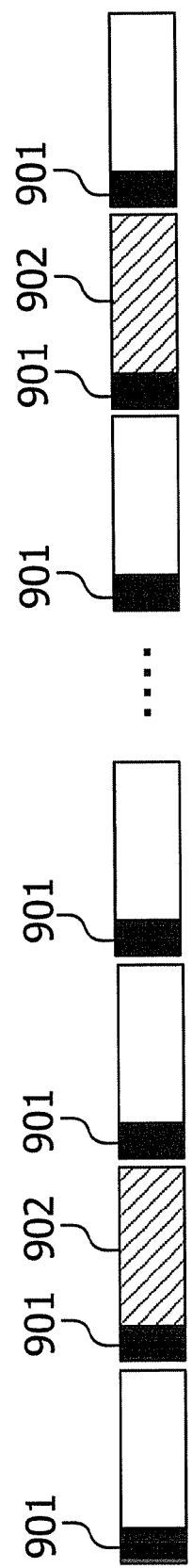
FIG. 9 illustrates a skew measurement signal.

As shown in FIG. 9, a signal on each channel is made up of blocks of predetermined size. A block synchronization pattern indicating the start position of a block is set in a header 901 of each block. A skew measurement pattern 902 is set for every predetermined number of blocks, and dummy data or the like is set in other blocks.

The block synchronizing circuit 811 detects the block synchronization pattern 901 of each channel, and outputs data within each block to the pattern detecting circuit 812. The pattern detecting circuit 812 detects the skew measurement pattern 902 from the data outputted from the block synchronizing circuit 811, and outputs the skew measurement pattern 902 to the skew calculating circuit 813. The skew calculating circuit 813 calculates skew between channels by using the skew measurement pattern 902 of each channel outputted from the pattern detecting circuit 812.

Figure 10:
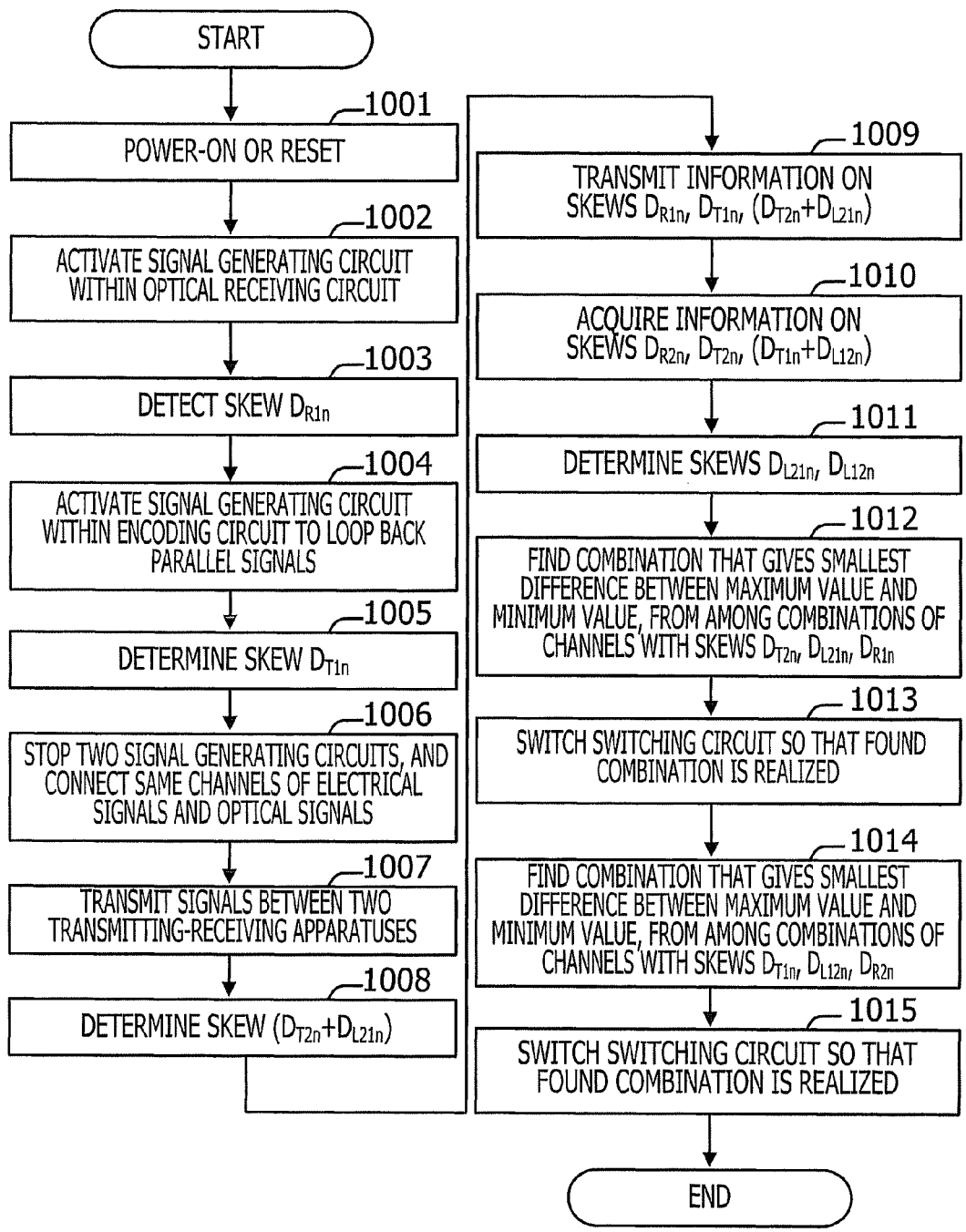
FIG. 10 illustrates a first flowchart of a switching control in which interchanging of channels is performed at both a transmitting side and a receiving side.

FIG. 10 is a flowchart of a switching control in the transmitting-receiving apparatus 401 in the case when interchanging of channels of parallel data signals is performed in both the transmitting-receiving apparatuses 401 and 404. The control circuit 423 starts the control upon power-on or reset of the transmitting-receiving apparatus 401 (operation 1001).

The control circuit 423 activates the signal generating circuit 435 within the optical receiving circuit 434, and the skew detecting circuit 425 within the decoding circuit 422. The control circuit 423 switches the switching circuit 432 so as to output parallel signals outputted from the signal generating circuit 435 to the code processing circuit 411 in a pass-through fashion (operation 1002). The skew detecting circuit 425 detects the amount of skew $DR1n$ in the path 471, and outputs the amount of skew $DR1n$ to the control circuit 423 (operation 1003).

Next, the control circuit 423 activates the signal generating circuit 424 within the encoding circuit 421, and switches the switching circuits 431 and 432 to loop the parallel signals outputted from the signal generating circuit 424 back to the code processing circuit 411 (operation 1004). The skew detecting circuit 425 detects the amount of skew in the path 472, and outputs the amount of skew to the control circuit 423. Then, the control circuit 423 subtracts the amount of skew $DR1n$ from the amount of skew in the path 471 to find the amount of skew $DT1n$ (operation 1005).

Next, the control circuit 423 stops the signal generating circuits 424 and 435, and switches the switching circuits 431 and 432 so that the same channels of electrical signals and optical signals are connected to each other (operation 1006). Thus, the same channels of the encoding circuit 421 and the optical transmitting circuit 433 are connected to each other in a pass-through fashion, and the same channels of the decoding circuit 422 and the optical receiving circuit 434 are connected to each other in a pass-through fashion.

Figure 2:
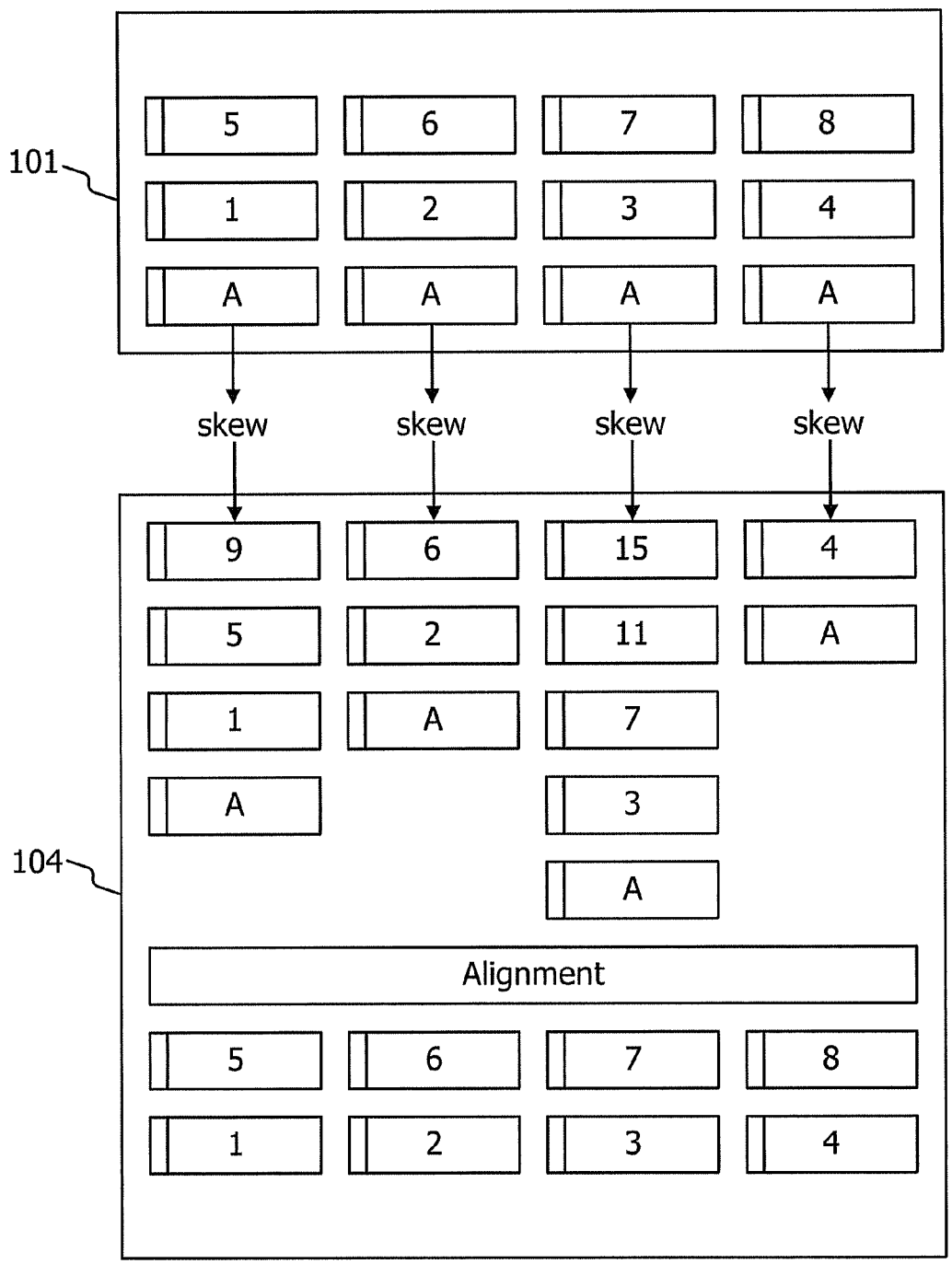
FIG. 2 illustrates a method of correcting accumulated skew.

Next, the control circuit 423 causes parallel signals to be transmitted between the transmitting-receiving apparatus 401 and the transmitting-receiving apparatus 404 via the transmission paths 402 and 403 (operation 1007). At this time, the signal generating circuits 424 and 465 operate as signal sources of parallel signals. It should be noted that the parallel signals shown in FIG. 2 may be used instead.

The skew detecting circuit 425 detects the amount of skew in the path 502, and outputs the amount of skew to the control circuit 423. Then, the control circuit 423 subtracts the amount of skew $DR1n$ from the amount of skew in the path 502 to find an amount of skew ($DT2n+DL21n$) (operation 1008).

Next, the control circuit 423 transmits information on the amounts of skew $DR1n$, $DT1n$, and ($DT2n+DL21n$) to the transmitting-receiving apparatus 404 by superimposing the information on the signals transmitted from the transmitting-receiving apparatus 401 to the transmitting-receiving apparatus 404 (operation 1009).

Next, the control circuit 423 acquires information on the amounts of skew $DR2n$, $DT2n$, and ($DT1n+DL12n$) superimposed on the signals transmitted from the transmitting-receiving apparatus 404 to the transmitting-receiving apparatus 401 (operation 1010). Then, the control circuit 423 determines the amounts of skew $DL21n$ and $DL12n$ by calculation of the following equations (operation 1011).

$$DL21n=(DT2n+DL21n)-DT2n$$

$$DL12n=(DT1n+DL12n)-DT1n$$

Next, the control circuit 423 finds, from among combinations of channels with the amounts of skew $DT2n$, $DL21n$, and $DR1n$, a combination that gives the smallest difference between the maximum value and minimum value of total skew as the sum of the three amounts of skew (operation 1012). This combination can be found by, for example, round-robin calculation or other suitable algorithms.

Next, the control circuit 423 switches the switching circuit 432 so that the found channel combination is realized (operation 1013). Next, the control circuit 423 finds, from among combinations of channels with the amounts of skew $DT1n$, $DL12n$, and $DR2n$, a combination that gives the smallest difference between the maximum value and minimum value of total skew as the sum of the three amounts of skew (operation 1014). This combination can be found by, for example, round-robin calculation or other suitable algorithms. Next, the control circuit 423 switches the switching circuit 431 so that the found channel combination is realized (operation 1015).

Figure 11:
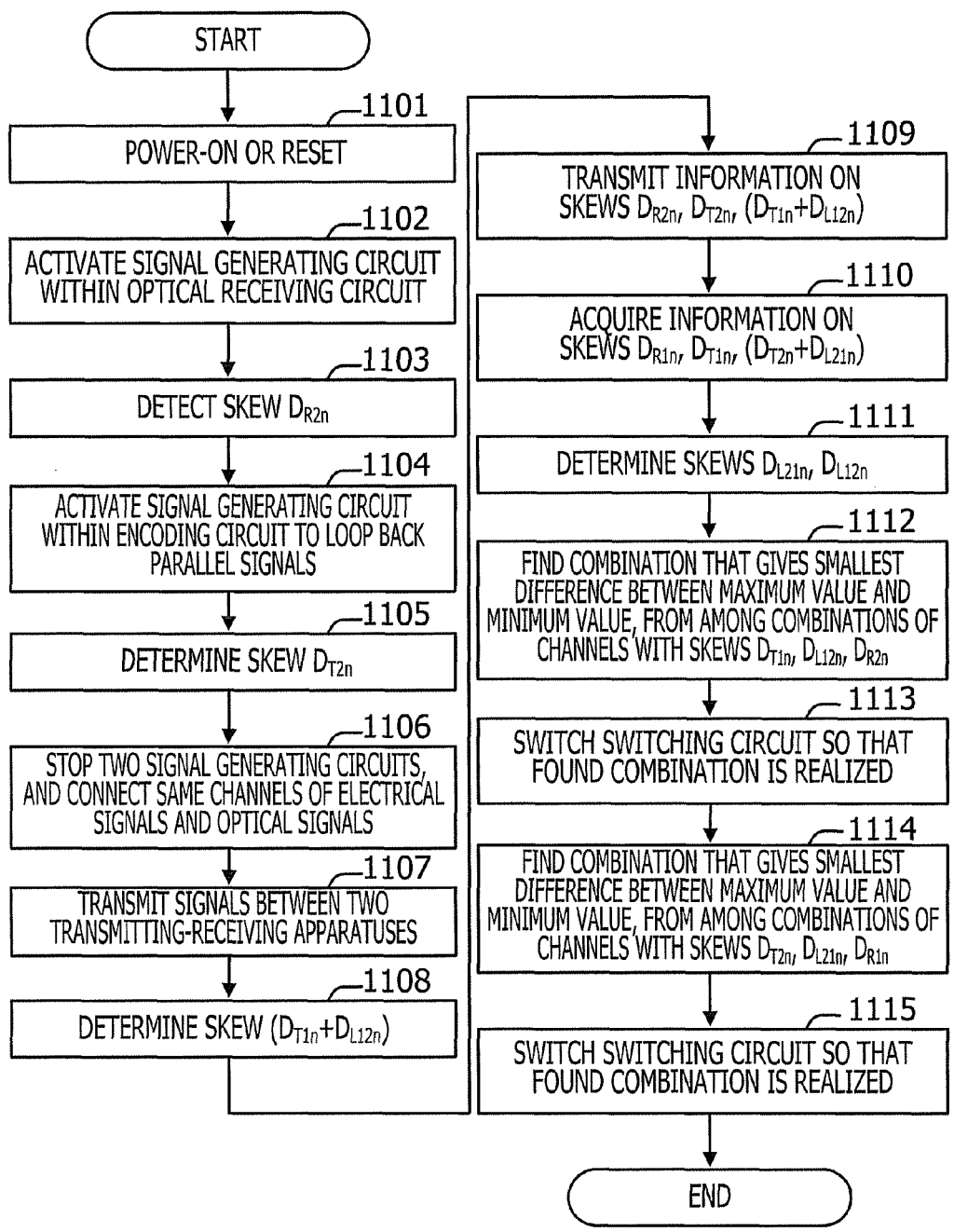
FIG. 11 illustrates a second flowchart of a switching control in which interchanging of channels is performed at both a transmitting side and a receiving side.

FIG. 11 is a flowchart of a switching control in the transmitting-receiving apparatus 404 in the case when interchanging of channels of parallel data signals is performed in both the transmitting-receiving apparatuses 401 and 404. The control circuit 463 starts the control upon power-on or reset of the transmitting-receiving apparatus 404 (operation 1101).

First, the control circuit 463 activates the signal generating circuit 455 within the optical receiving circuit 451, and the skew detecting circuit 464 within the decoding circuit 461. Next, the control circuit 463 switches the switching circuit 453 so as to output parallel signals outputted from the signal generating circuit 455 to the code processing circuit 422 in a pass-through fashion (operation 1102). Then, the skew detecting circuit 464 detects the amount of skew $DR2n$ in the path 473, and outputs the amount of skew $DR2n$ to the control circuit 463 (operation 1103).

Next, the control circuit 463 activates the signal generating circuit 465 within the encoding circuit 462, and switches the switching circuits 453 and 454 to loop the parallel signals outputted from the signal generating circuit 465 back to the code processing circuit 442 (operation 1104). The skew detecting circuit 464 detects the amount of skew in the path 474, and outputs the amount of skew to the control circuit 463. Then, the control circuit 463 subtracts the amount of skew $DR2n$ from the amount of skew in the path 474 to find the amount of skew $DT2n$ (operation 1105).

Next, the control circuit 463 stops the signal generating circuits 455 and 465, and switches the switching circuits 453 and 454 so that the same channels of electrical signals and optical signals are connected to each other (operation 1106). Thus, the same channels of the encoding circuit 462 and the optical transmitting circuit 452 are connected to each other in a pass-through fashion, and the same channels of the decoding circuit 461 and the optical receiving circuit 451 are connected to each other in a pass-through fashion.

Next, the control circuit 463 causes parallel signals to be transmitted between the transmitting-receiving apparatus 401 and the transmitting-receiving apparatus 404 via the transmission paths 402 and 403 (operation 1107). The skew detecting circuit 464 detects the amount of skew in the path 501, and outputs the amount of skew to the control circuit 463. Then, the control circuit 463 subtracts the amount of skew $DR2n$ from the amount of skew in the path 501 to find the amount of skew ($DT1n+DL12n$) (operation 1108).

Next, the control circuit 463 transmits information on the amounts of skew DR2n, DT2n, and (DT1n+DL12n) to the transmitting-receiving apparatus 401 by superimposing the information on the signals transmitted from the transmitting-receiving apparatus 404 to the transmitting-receiving apparatus 401 (operation 1109).

Next, the control circuit 463 acquires information on the amounts of skew DR1n, DT1n, and (DT2n+DL21n) superimposed on the signals transmitted from the transmitting-receiving apparatus 401 to the transmitting-receiving apparatus 404 (operation 1110). Then, the control circuit 463 determines the amounts of skew DL21n and DL12n by calculation of the following equations (operation 1111).

$$DL21n=(DT2n+DL21n)-DT2n$$

$$DL12n=(DT1n+DL12n)-DT1n$$

Next, the control circuit 463 finds, from among combinations of channels with the amounts of skew DT1n, DL12n, and DR2n, a combination that gives the smallest difference between the maximum value and minimum value of total skew as the sum of the three amounts of skew (operation 1112).

Next, the control circuit 463 switches the switching circuit 453 so that the found channel combination is realized (operation 1113). Next, the control circuit 463 finds, from among combinations of channels with the amounts of skew DT2n, DL21n, and DR1n, a combination that gives the smallest difference between the maximum value and minimum value of total skew as the sum of the three amounts of skew (operation 1114).

Next, the control circuit 463 switches the switching circuit 454 so that the found channel combination is realized (operation 1115). Through the switching control in FIGS. 10 and 11, such a combination of channels that reduces the total skew is realized with respect to each of the paths 501 and 502.

For example, if values as shown in FIG. 12 are obtained as the amounts of skew DT1n, DL12n, and DR2n (n=0, 1, 2, 3), when individual channels are connected in a pass-through fashion, the total skews of channels 0, 1, 2, 3 are 75 ns, 40 ns, 20 ns, 0 ns, respectively. Thus, the difference between the maximum value 75 ns and the minimum value 0 ns of total skew is 75 ns.

On the other hand, by performing round-robin calculation of the amounts of skew DT1n, DL12n, and DR2n (n=0, 1, 2, 3), the channel combination as shown in FIG. 13 can be found. According to this channel combination, the total skews of signals VL0, VL1, VL2, VL3 are 35 ns, 35 ns, 30 ns, 35 ns, respectively. Thus, the difference between the maximum value 35 ns and the minimum value 30 ns of total skew is 5 ns, making it possible to reduce the FIFO circuit necessary for skew correction in the decoding circuit 461. The channel combination with respect to the amounts of skew DT2n, DL21n, and DR1n (n=0, 1, 2, 3) can be also found by similar round-robin calculation.

While interchanging of channels is performed at both the transmitting side and the receiving side in the switching controls shown in FIGS. 10 and 11, interchanging of channels may be performed at only one of the transmitting side and the receiving side.

Figure 14:
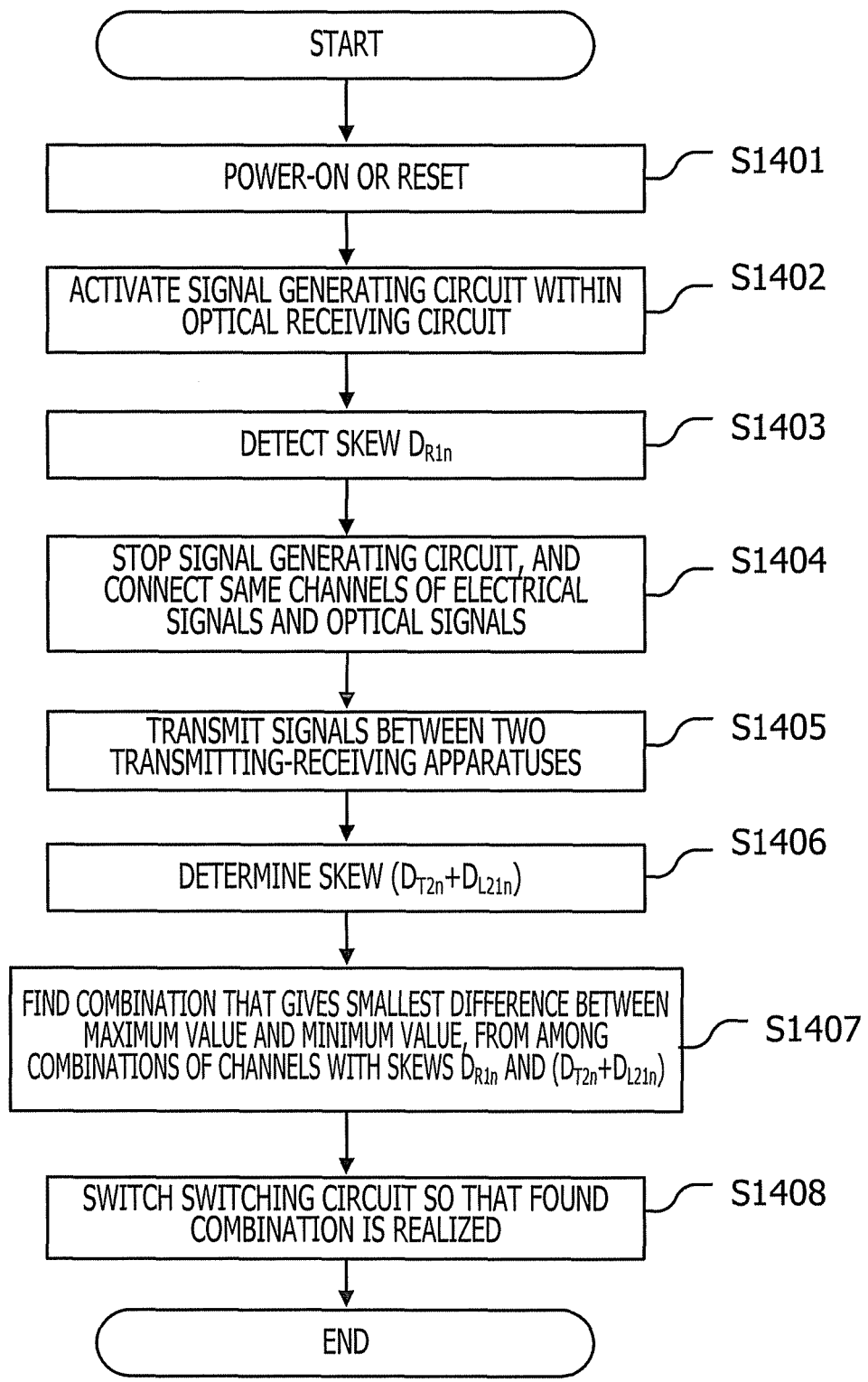
FIG. 14 illustrates a first flowchart of a switching control in which interchanging of channels is performed at only a receiving side.

FIG. 14 is a flowchart of a switching control in the transmitting-receiving apparatus 401 in the case when interchanging of channels of parallel data signals is performed at only the receiving side. The operations in operation 1401 to 1403 are the same as the operations in operations 1001 to 1003 in FIG. 10, and the operations in operation 1404 to 1406 are the same as the operations in operations 1006 to 1008 in FIG. 10.

When the operation in operation 1406 is finished, the control circuit 423 finds, from among combinations of channels with the amounts of skew DR1n and (DT2n+DL21n), a combination that gives the smallest difference between the maximum value and minimum value of total skew as the sum of the two amounts of skew (operation 1407). This combination can be found by, for example, round-robin calculation or other suitable algorithms.

Figure 15:
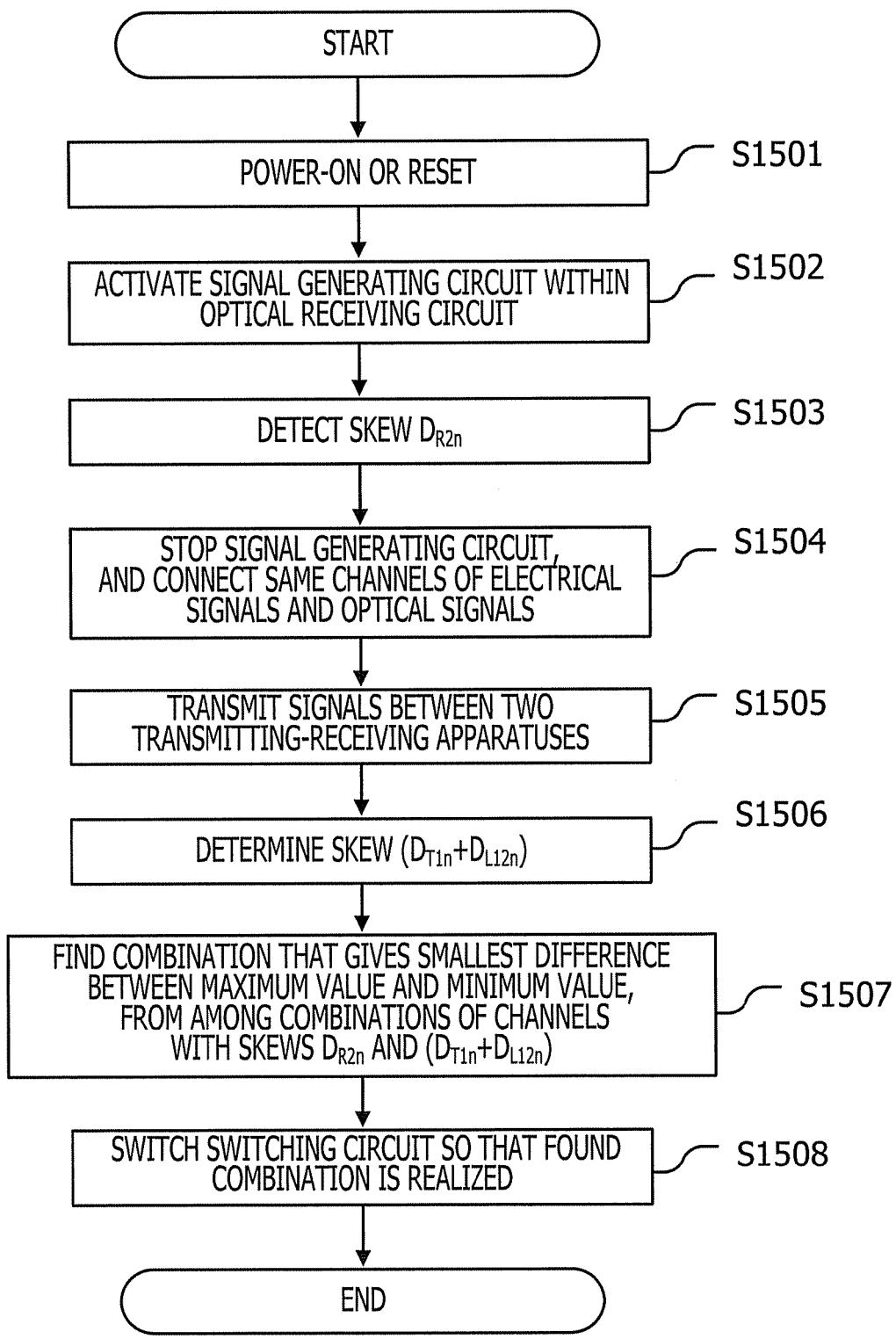
FIG. 15 illustrates a second flowchart of a switching control in which interchanging of channels is performed at only a receiving side.

Next, the control circuit 423 switches the switching circuit 432 so that the found channel combination is realized (operation 1408). FIG. 15 is a flowchart of a switching control in the transmitting-receiving apparatus 404 in the case when interchanging of channels of parallel data signals is performed at only the receiving side.

The operations in operation 1501, 1502 and 1503 are the same as the operations in operations 1101, 1102 and 1103 in FIG. 11, and the operations in operation 1504 to 1506 are the same as the operations in operations 1106 to 1108 in FIG. 11.

When the operation in operation 1506 is finished, the control circuit 463 finds, from among combinations of channels with the amounts of skew DR2n and (DT1n+DL12n), a combination that gives the smallest difference between the maximum value and minimum value of total skew as the sum of the two amounts of skew (operation 1507). This combination can be found by, for example, round-robin calculation or other suitable algorithms.

Next, the control circuit 463 switches the switching circuit 453 so that the found channel combination is realized (operation 1508). Through the switching control in FIGS. 14 and 15, such a combination of channels that reduces the total skew is realized with respect to each of the paths 501 and 502. In addition, according to this switching control, there is no need to transmit information on amount of skew determined at the receiving side to the transmitting side, so the control procedure is simplified.

Figure 16:
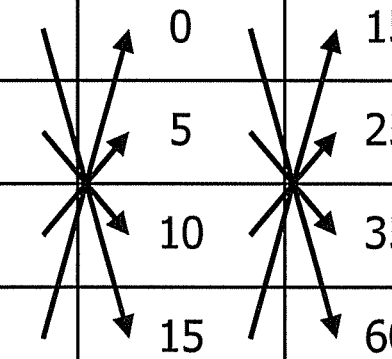
FIG. 16 illustrates amounts of skew reduced by a switching control in which interchanging of channels is performed at only a receiving side.

A case is considered in which, as the amounts of skew DR2n and (DT1n+DL12n), for example, the amounts of skew DT1n, DL12n, DR2n as shown in FIG. 12 are obtained. In this case, by performing round-robin calculation of the amounts of skew DR2n and (DT1n+DL12n)(n=0, 1, 2, 3), the channel combination as shown in FIG. 16 can be found.

According to this combination, the total skews of signals VL0, VL1, VL2, VL3 are 60 ns, 35 ns, 25 ns, 15 ns, respectively. Thus, the difference between the maximum value 60 ns and the minimum value 15 ns of total skew is 45 ns, making it possible to reduce the FIFO circuit necessary for skew correction in the decoding circuit 461.

The channel combination with respect to the amounts of skew DR1n and (DT2n+DL21n)(n=0, 1, 2, 3) can be also found by similar round-robin calculation. It should be noted that while the number of channels of parallel data signals is 4 in the exemplary configurations in FIGS. 3 to 5, it is also possible to change the number of channels to a number N other than 4. In this case, 2N-input 2N-output switching circuits may be used as the switching circuits 431, 432, 453, and 454.

The method includes detecting an amount of skew corresponding to channels between a transmitting side and a receiving side, and within the transmitting side and the receiving side, and interchanging channels of parallel data signals prior to transmitting to the receiving side and subsequent to the transmitting in accordance with a total skew calculated for each channel in a path from said detecting. According to an embodiment, adjusting the skew is not limited to a receiving end of the system.

In addition, in the exemplary configuration in FIGS. 4 and 5, the skew of only one of parallel data signals transmitted from the transmitting-receiving apparatus 401 to the transmitting-receiving apparatus 404, and parallel data signals transmitted from the transmitting-receiving apparatus 404 to the transmitting-receiving apparatus 401 may be reduced.

While embodiments of the disclosure and their advantages have been described in detail, those skilled in the art can make various modifications, additions, and omissions without departing from the scope of the present invention clearly set forth in the claims.

Since a total skew accumulated during transmission of parallel data signals is reduced, an increase in the circuit scale of the deskew circuit in the receiving apparatus can be avoided.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention, the scope of which is defined in the claims and their equivalents.

What is claimed is:

1. A receiving apparatus which receives parallel data signals including a plurality of channels from a transmitting apparatus, comprising:
   at least one processor to execute:
      receiving the parallel data signals;
      detecting a first skew between channels within the receiving apparatus, and a second skew between channels prior to the receiving of the parallel data signals; and
      interchanging the plurality of channels of the parallel data signals so as to reduce a total skew as a sum of the first skew and the second skew.

2. The receiving apparatus according to claim 1, wherein the second skew includes:
   a third skew between channels within the transmitting apparatus, and
   a fourth skew between channels between the transmitting apparatus and the receiving apparatus, and
   wherein the detecting detects the first skew, the third skew, and the fourth skew, and
   the interchanging interchanges the plurality of channels of the parallel data signals so as to reduce a total skew as a sum of the first skew, the third skew, and the fourth skew.

3. The receiving apparatus according to claim 1, comprising:
   a first circuit having a processor, and
   a second circuit having a processor, wherein
      the first circuit executes the detecting,
      the second circuit executes the receiving, and outputting parallel signals including the plurality of channels to the first circuit, and
      the detecting detects a skew between channels between the first circuit and the second circuit, as the first skew by using the parallel signals.

4. The receiving apparatus according to claim 3, wherein the detecting detects a third skew between channels of parallel signals including the plurality of channels and transmitted from the transmitting apparatus, receives from the transmitting apparatus information on a fourth skew between channels within the transmitting apparatus, and subtracts the fourth skew from the third skew to determine a fifth skew between channels between the transmitting apparatus and the receiving apparatus, and
   the interchanging interchanges the plurality of channels of the parallel data signals so as to reduce a total skew as a sum of the first skew, the fourth skew, and the fifth skew.

5. The receiving apparatus according to claim 1, wherein the interchanging occurs between any of the receiving apparatus, the transmitting apparatus and a transmission path between respective apparatuses.

6. A transmitting-receiving apparatus which transmits first parallel data signals including a plurality of channels to a receiving apparatus, and receives second parallel data signals including the plurality of channels from a transmitting apparatus, comprising:
   a first circuit;
   a second circuit; and
   a skew-reducer, and
   wherein the first circuit includes:
      a first output unit to output first parallel signals including the plurality of channels to the second circuit, and
      a detector to detect a first skew between channels in a direction from the first circuit to the second circuit, and a second skew between channels in a direction from the second circuit to the first circuit,
   the second circuit includes:
      a transmitter to transmit the first parallel data signals,
      a receiver to receive the second parallel data signals,
      a second output unit to output second parallel signals including the plurality of channels to the first circuit, and
      a loop-back unit to output the first parallel signals outputted from the first output unit to the first circuit,
   the detector detects the first skew and the second skew by using the first parallel signals and the second parallel signals, and
   the skew-reducer reduces at least one of a skew of the first parallel data signals including the first skew, and a skew of the second parallel data signals including the second skew by interchanging the plurality of channels of the parallel data signals.

7. The transmitting-receiving apparatus according to claim 6, wherein the skew-reducer interchanges the plurality of channels of the first parallel data signals so as to reduce the skew of the first parallel data signals, and interchanges the plurality of channels of the second parallel data signals so as to reduce the skew of the second parallel data signals.

8. The transmitting-receiving apparatus according to claim 6, wherein the interchanging occurs between channels of the parallel data signals used by any of the receiving apparatus, the transmitting apparatus and a transmission path between respective apparatuses.

9. A transmission system which transmits parallel data signals including a plurality of channels from a transmitting apparatus to a receiving apparatus, comprising:
the transmitting apparatus including:
a first detector to detect a first skew between channels within the transmitting apparatus, a second skew between channels between the transmitting apparatus and the receiving apparatus, and a third skew between channels within the receiving apparatus,
a first switch to interchange the plurality of channels of the parallel data signals so as to reduce a total skew as a sum of the first skew, the second skew, and the third skew, and
a transmitter to transmit the parallel data signals whose channels have been interchanged,
the receiving apparatus including:
a receiver to receive the parallel data signals transmitted from the transmitting apparatus,
a second detector to detect the first skew, the second skew, and the third skew, and
a second switch to interchange the plurality of channels of the received parallel data signals so as to reduce the total skew as the sum of the first skew, the second skew, and the third skew.

10. The transmission system according to claim 9, wherein the transmitting apparatus includes:
a first circuit, and
a second circuit,
the first circuit includes:
the first detector, and
a first output unit to output first parallel signals including the plurality of channels to the second circuit,
the second circuit includes:
the transmitter,
a second output unit to output second parallel signals including the plurality of channels to the first circuit, and
a loop-back unit to output the first parallel signals outputted from the first output unit to the first circuit, and
the first detector detects a skew between channels between the first circuit and the second circuit, as the first skew by using the first parallel signals and the second parallel signals.

11. The transmission system according to claim 9, wherein the receiver includes:
a first circuit which includes the second detector, and
a second circuit,
the second circuit includes:
the receiver, and
an output unit to output parallel signals including the plurality of channels to the first circuit, and
the second detector detects a skew between channels between the first circuit and the second circuit, as the third skew by using the parallel signals.

12. The transmission system according to claim 9, wherein the interchange occurs between channels of the parallel data signals used by any of the receiving apparatus, the transmitting apparatus and a transmission path between respective apparatuses.

13. A method of controlling data signals, comprising:
detecting an amount of skew corresponding to channels between a transmitting side and a receiving side, and within the transmitting side and the receiving side; and
interchanging channels of parallel data signals prior to transmitting to the receiving side and subsequent to the transmitting in accordance with a total skew calculated for each channel in a path based on said detecting.

14. The method according to claim 13, wherein the interchanging occurs between channels of the parallel data signals used by any of a receiving apparatus, a transmitting apparatus and a transmission path between respective apparatuses.

* * * * *

UNITED STATES PATENT AND TRADEMARK OFFICE
CERTIFICATE OF CORRECTION

PATENT NO. : 8,582,670 B2  
APPLICATION NO. : 12/768190  
DATED : November 12, 2013  
INVENTOR(S) : Naoki Kuwata Page 1 of 1

It is certified that error appears in the above-identified patent and that said Letters Patent is hereby corrected as shown below:

On the Title Page, Item 54 and in the Specification, in Column 1, Line 3, Delete "SYSTEM METHOD" and insert -- SYSTEM AND METHOD --, therefor.

Signed and Sealed this  
Eighteenth Day of February, 2014

Michelle K. Lee  
*Deputy Director of the United States Patent and Trademark Office*